Feb. 2, 1954
C. E. JOOS
2,668,144
TREATMENT OF WATER FOR THE REMOVAL OF SILICA
Filed Nov. 3, 1949
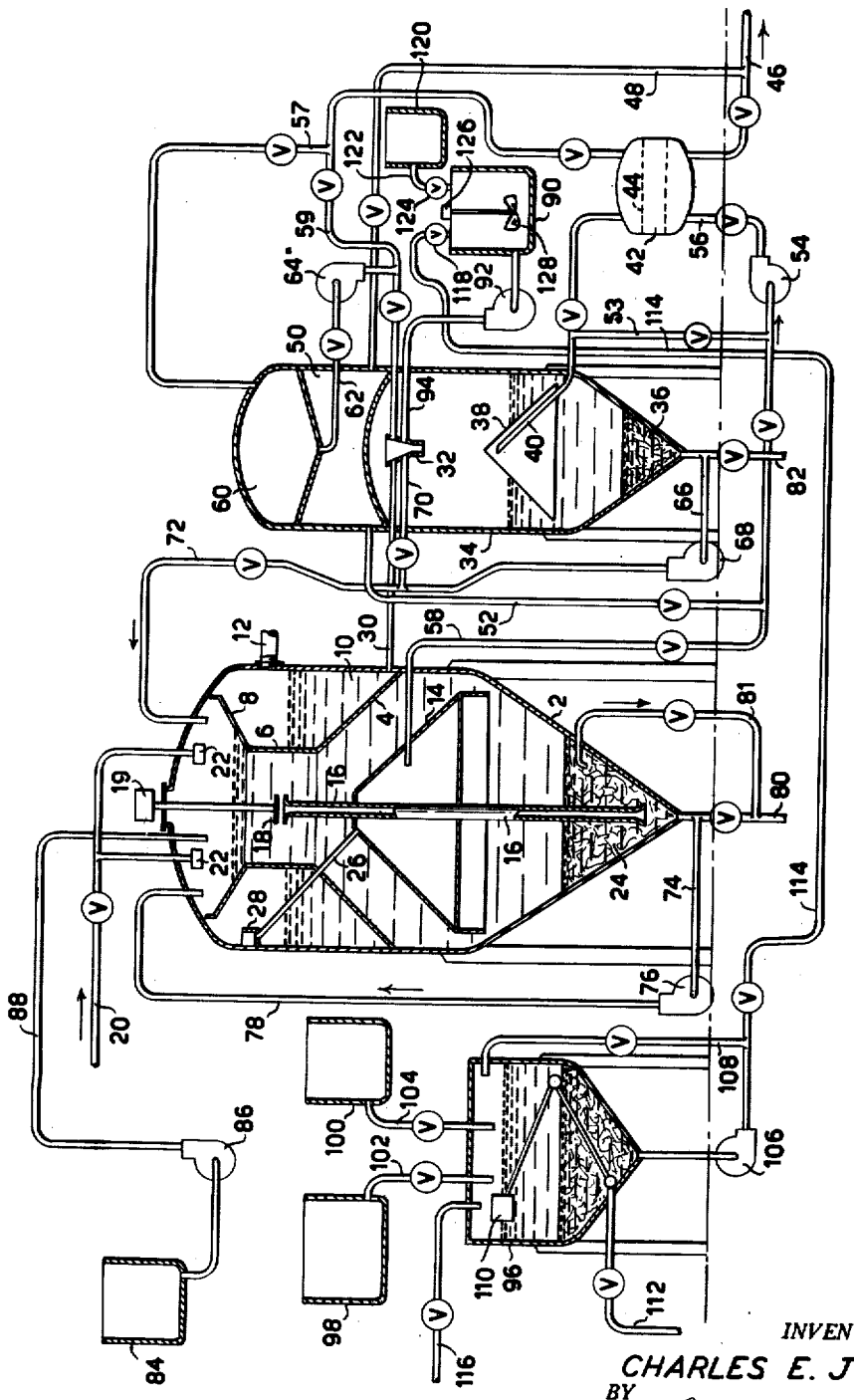
INVENTOR.
CHARLES E. JOOS
BY
ATTORNEYS.

Patented Feb. 2, 1954

2,668,144

UNITED STATES PATENT OFFICE 2,668,144

TREATMENT OF WATER FOR THE REMOVAL OF SILICA

Charles E. Joos, Wyncote, Pa., assignor to Cochrane Corporation, Philadelphia, Pa., a corporation of Pennsylvania Application November 3, 1949, Serial No. 125,307

5 Claims. (Cl. 210—16)

1

This invention relates to the treatment of water, for example, that used for boiler feed, particularly for the removal of silica which may occur in solution in the form of silicates or some other dispersed form.

Silica, if allowed to enter the boiler feed in appreciable quantities, will tend to form hard silicious deposits which are difficult to remove, or if maintained in solution will cause deposits in turbines when carried over with the steam.

It is well known in the art that such silica may be removed from water by treatment with magnesium in the form of its hydrated oxide, its hydroxide either in the cold or in the hot process method of treatment. The present invention is concerned principally with the hot process where because of the higher temperatures it is found that the silica removal process is much more effective and efficient.

It is known in the art that the use of precipitated magnesium hydroxide is more effective in the adsorption of silica than is the hydrated oxide introduced with the water as magnesium oxide either as such or as a constituent of dolomitic lime.

The relative difference in the adsorbing capacities of magnesium oxide and magnesium hydroxide precipitated from magnesium sulfate, when placing these two chemicals on an equivalent magnesium basis, can be appreciated by considering that in treating water containing 44 p. p. m. of silica with magnesium oxide 4.2 equivalents of magnesium oxide are required, whereas, with the use of magnesium hydroxide, 3.2 equivalents are required.

The use of magnesium sulfate or chloride and an alkali such as sodium hydroxide as a source of magnesium hydroxide has not been generally employed, due to the production of the byproduct of sodium sulfate or sodium chloride which increases the total solid content of the feed water, and for that reason, is objectionable.

It is an object of this invention to provide treatment of water with magnesium hydroxide for the removal of silica without the introduction into the water of soluble salts such as sodium sulfate, at least in any pronounced quantities.

Heretofore the magnesium hydroxide has been produced by precipitation from the combination of magnesium sulfate or chloride with an alkali such as caustic soda within the sedimentation chamber so that the byproducts formed a part of the feed water solids. This invention removes this objection by treating the magnesium sulfate or chloride with an alkali, such as caustic

2 soda externally to the sedimentation tank, permitting the magnesium hydroxide to settle, decanting the byproducts which are highly soluble, washing the precipitate with fresh water and delivering the precipitate to one of the chemical feed tanks where it is introduced proportionally to the reaction tanks.

A further object of the invention is to conduct the silica removal process in two stages in a process such as the two-stage softening process disclosed in the patent to C. E. Joos 2,142,515, dated January 3, 1939, in which the softening process is conducted in two tanks, the first tank serving the purpose of reducing the haradness to the order of 25 p. p. m. by the use of lime and soda ash, and the second sedimentation tank operates in series with the first tank utilizing as reagents disodium phosphate or the like reducing the hardness substantially to zero.

The foregoing and other objects particularly relating to details will become apparent from the following description, read in conjunction with the accompanying drawing, in which the figure is a diagram indicating a preferred type of apparatus for carrying out the process.

The first stage treating tank is indicated at 2 and is generally conventional and of the type used in hot water softening processes. An internal wall arrangement comprising the conical wall 4, a cylindrical extension 6 thereof and an upper funnel-like extension 8 divides the tank into two sections, one being the upper annular section 10 in which water treated in the first stage of the process accumulates and the other of which is the portion below and inside the structure just described constituting the treatment chamber. An inlet 12 is provided at the upper end of the tank for the introduction of steam, for example, exhaust steam, at a pressure of about 10 lbs. per square inch gauge. This serves to maintain the proper temperature for the most effective treatment, the contents of the treaing chamber being desirably at a temperature of about 212 to 300° F.

A take-off region is provided beneath a conical wall 14, the skirt of which is spaced from the inner wall of the tank to provide for downflow thereabout. A tube 16 extends vertically within the tank and at its upper end is provided with a sludge circulating pump arrangement of the rotary disc type indicated at 18 which is driven by a motor 19. By this arrangement, sludge 24 is withdrawn from the conical bottom of the tank and circulated up into the cylinder provided by the wall 6. The water to be treated is introduced through pipe 20 and spray nozzles 22 serving to expose it to the steam and thereby effect rapid heating. A pipe connection 26 extends from the upper closed end of the cone 14 to an overflow trough 28 from which the water treated in the first stage passes into the chamber 10.

A connection 30 joins the lower end of the chamber 10 with a distributor 32 in the second stage treatment tank 34. This tank is provided with a conical bottom in which accumulates sludge 36 and is provided with a cone 38 from the interior of the top of which treated water is withdrawn through the connection 40 and passes to one or more filters indicated at 42, the layer of filtering material in which is indicated at 44. If a plurality of filters is used, they are arranged in parallel and deliver the filtered water to the supply line 46 for use as, for example, for feeding a boiler.

A connection 48 from the line 46 communicates with a tank 50 which may be, though not necessarily, in the form of an upward extension of the treatment tank 34. From the lower end of this tank 50 there extends connection 52 which communicates with the intake of a pump 54 which discharges through a line 56 into the bottom of a filter or filters 42 for the purpose of backwash of the filters. A line 53 may join line 40 and the interior of the upper portion of cone 38 with the intake of the pump 54 and line 58 may also join the interior of the upper portion of the cone 14 with the intake of the pump 54. As indicated, suitable valves may be provided for the proper control of flow.

The backwash outlet from the upper end or ends of the filter or filters 42 is provided by a line 57 which communicates with another tank 60 which may also surmount the treatment tank 34. From this tank 60 a pump 64 may deliver the backwash fluid through line 62 to the distributor 32 in the tank 34. Alternately, the backwash flow may be carried through lines 57 and 59 directly to the distributor 32 in treatment tank 34.

Sludge recirculation is provided in connection with the tank 34 by lines 66 and 70 and pump 68. A branch line 72 from the discharge of the pump 68 leads into the top of the tank 2 above the funnel portion 8.

Besides the sludge recirculation in the tank 2 provided by the pump 18, there may be provided an auxiliary circulating line comprising the piping 74 and 78 and the pump 76.

Sludge discharge to waste is provided from the tanks 2 and 34 at 80 and 82.

A supply tank 84 is provided for the formation of a sludge for treating purposes by the reaction of sodium carbonate and lime, which lime in the present instance is preferably dolomitic lime containing magnesium oxide. This sludge is delivered through the pump 86 and connection 88 to the upper end of the treatment region of the tank 2.

For the provision of precipitated magnesium hydroxide, there is a tank 96 which is supplied with magnesium sulfate solution from a tank 98 through connection 102 and with sodium hydroxide solution from a tank 100 through a connection 104. A pump 106 takes the magnesium hydroxide sludge from the bottom of the tank 96 and may either recirculate it into the top of this tank through the connection 108 or, alternatively, may deliver it through the line 114 and valve 118 to the tank 90. An offtake connection of the float type is provided at 110 in the tank 96 for the purpose of decanting liquid from above the sludge to waste through the discharge 112. A water connection may be provided at 116 for the introduction of water into the tank 96.

The tank 120 is supplied with a solution of some form of phosphate, such as disodium phosphate, trisodium phosphate, or phosphoric acid and is connected through line 122 and valve 124 to tank 90. The valves 118 and 124 are controlled by conventional means to proportion the respective flows of solution therethrough. Motor 126 drives the stirrer 128 for the purpose of maintaining the magnesium hydroxide precipitate in suspension. Tank 90 is connected to the distributor 32 through the pump 92 and connection 94 so that the phosphoric acid or phosphate solution and the magnesium hydroxide may be delivered into the second stage treatment tank 34.

As indicated in the drawing, the various connections are provided with suitable valves to route the various liquids and sludges in proper directions as will now become clear from a description of the treating process.

First reference will be made to the formation of precipitated magnesium hydroxide free or substantially free from soluble salts such as sodium sulphate.

Properly measured quantities of magnesium sulphate and sodium hydroxide solutions are run into the tank 96 from the tanks 98 and 100 so that they will react to provide a sludge of magnesium hydroxide with the concurrent formation of sodium sulphate in solution. This reaction may be rendered complete by providing thorough admixture of the solutions by operation of the pump 106 to recirculate the contents of the tank through the connection 108. Following completion of the reaction, the recirculation is stopped and the sludge is permitted to settle in the bottom of the tank. By opening the valve in the wasteline 112 the supernatant liquid containing sodium sulphate may be decanted off through the float connection 110. This decantation may suffice to lessen the sodium sulphate content of the sludge to a sufficient degree but, if further removal is desired, water may be introduced through 116, the contents of the tank recirculated by the pump 106, the sludge permitted to settle and decantation again effected. If desired, this operation of washing the sludge may be repeated until substantially all of the soluble salt is removed. It will, of course, be evident that instead of magnesium sulfate other salts such as chloride may be used and the alkali salt of the acid radical may be removed in the fashion described. The magnesium hydroxide sludge is then delivered by the pump 106 through the connection 114, the connection 108 being closed, and the valve 118 into the tank 90. In tank 90 the magnesium hydroxide sludge is mixed with a proportionate amount of a phosphoric acid or phosphate solution received from tank 120 through line 122 and this mixture is then delivered either intermittently or continuously through pump 92 and line 94 through the distributor 32 into the second stage treatment tank 34.

Water to be treated is introduced at 20 into the tank 2 and simultaneously there is introduced in measured quantity the sludge from tank 84 containing the calcium carbonate precipitate and sodium hydroxide in solution. There is also present a small surplus quantity of sodium carbonate which has not undergone reaction with the lime. The sodium hydroxide reacts with the magnesium compounds in the water being treated, precipitating the magnesium as a hydrate. This magnesium precipitate carries with it, by adsorption, a portion of the silica content of the water being treated.

If a greater reduction in silica is desired in this first stage of treatment than is provided by the precipitation of the magnesium in the raw water, magnesium may be added either in the form of magnesium oxide purchased as such or by employing dolomitic lime having the formula $$Ca(OH)_2MgO$$

for reaction with the sodium carbonate. Thus, additional magnesium precipitate may be provided to increase the silica removal in the first stage of treatment.

The sedimentation tank is customarily designed to retain the liquids undergoing treatment for one hour to permit the growth and settling of the precipitate, so that relatively clear water will be obtained as the effluent. The precipitate is permitted to accumulate in the sludge cone formed by the base of tank 2. Recirculation of the sludge in the tank 2 is effected through operation of the pump 18 and the pump 76. The sludge may be bled off continuously to the drain 80 through the connection 81 or may be intermittently drawn off as it accumulates. This recirculation of sludge aids the chemical reaction and recycles the magnesium hydrate so that it will be available to adsorb additional silica. The amount of sludge to be recirculated will customarily be of the order of 5% of the flow of raw water to the unit. It is essential that this sludge be of the correct consistency and it is preferable that it be maintained at a concentration or consistency of approximately 60%. This percentage concentration of sludge is defined as the percentage of the sludge in a sample taken from the sludge cone that settles after a period of twenty minutes. It is customary to take a 100 ml. sample in a graduate and if this sludge settles to the 60 ml. mark in a period of twenty minutes the sludge concentration is designated at 60%.

Experience has indicated that while the density of this sludge is not critical, it should never be less than 20% and sometimes should be maintained at concentrations approaching 100%. However, it is important in the silica removal process that this sludge concentration be maintained at all times above 20%.

In tank 2 the normal softening occurs and the ionic magnesium content in the raw water supply will reduce the silica in the raw water appreciably. The amount of silica reduction will depend obviously on the content of magnesium in the raw water supply. As an example of the reduction obtained, raw water of the following analysis, when treated in a hot process softener with lime and soda ash without the addition of magnesium and with a sludge recirculation of 60% concentration, as defined by the aforementioned test, showed a reduction of silica down to 1 p. p. m. in the treated water:

| | P. p. m. |
|---|---|
| Calcium carbonate | 104.0 |
| Calcium sulphate | 35.3 |
| Magnesium sulphate | 67.2 |
| Magnesium chloride | 5.7 |
| Silica | 12.0 |
| Sodium chloride | 22.8 |
| Total solids | 247.0 |

Where lower silica concentrations are desired at this stage of treatment the magnesium in the raw water supply can be fortified by magnesium oxide or by the use of dolomitic lime as previously described.

The water which accumulates in the cone 14 above the bed of sludge 24 will flow into the region 10 of the tank, it being noted that overflow at 28 will occur due to the maintenance of a head in the treatment portion of the tank due to the inflowing water and chemicals.

From the region 10 the water thus treated in the first stage flows into the tank 34 where it becomes admixed with the phosphate reagent and the magnesium hydroxide sludge delivered to this tank from the tank 90. It will be noted that the water which has had some of its silica removed is now treated by the more effective precipitated magnesium hydroxide to accomplish further removal of the silica. The phosphate reagent reacts with the calcium and magnesium salt to reduce the remanent hardness from approximately twenty to zero. The magnesium hydroxide adsorbs a portion of the silica and, at the same time, being an excellent coagulant aids in the flocculation of the calcium phosphate. A slurry pool is maintained in the conical bottom of the tank and a portion of this slurry is returned to the top of the sedimentation tank for reuse. This recirculation is effected through the connections 66 and 70 and pump 68. The treated water accumulating above the sludge in the cone 38 passes from the upper region within this cone through connection 40 to the filter or filters 42 whence it is delivered to the supply line 46.

Some of the magnesium hydroxide will, of course, be carried over into the filters and will accumulate on the surface of the sand therein. When the filters become covered to a depth indicated by a pressure loss of approximately 5 feet, they are backwashed by the closing of the valves in the normal delivery lines and the opening of the valves in the connections 56 and 52 and the operation of pump 54. This backwash is effected through the use of filtered water from tank 50, though, if desired, some water treated in the first stage may be used for this purpose, being delivered through the line 58 from the interior of the cone 14, or water treated in the second stage may be used for this purpose being delivered through the line 53 from the interior of the cone 38. The backwash flowing from the filter through the line 57 will contain magnesium hydroxide which has accumulated on the top of the filtered sand. The backwash water containing the magnesium hydroxide may be accumulated in tank 60 and is then delivered to the tank 34 through the connection 62 and pump 64, or if desired, the backwash may be passed directly to tank 34 through lines 57 and 59.

As the sludge at 36 accumulates, it may be taken off through the line 66 and pump 68 and delivered in part during or independently of recirculation in the tank 34 through the line 72 into the tank 2. It will be noted that except for the backwash portion of a cycle the various events which have been separately described may be carried on simultaneously and continuously, i. e., the magnesium hydroxide may be pumped from the backwash accumulating tank 60 into the tank 34 and thence bled back into the first stage tank 2, sludge being continuously removed from this tank through the connection 81 as it accumulates above the desired level.

The effective treatment with the precipitated magnesium hydroxide will now be apparent. The magnesium hydroxide accumulating in the filter or filters is effective to treat the outgoing water as it is filtered. This magnesium hydroxide may still be effective for further treatment and by the procedure described is reintroduced into the tank 34 where it aids the original precipitated magnesium hydroxide in the treatment of water in the second stage from which the silica has been in part removed. Its effective action, however, does not even here terminate since it is not discharged to drain from the tank 34 but is pumped back into the first stage tank 2 where it aids the magnesium oxide in the initial treatment of the inflowing water. Accordingly, a maximum use of the relatively costly magnesium hydroxide is secured. The path of the magnesium hydroxide is thus in countercurrent relationship with the direction of flow of the water undergoing treatment.

It may be noted that, while the arrangement described is preferred, it is, of course, possible to return the backwash from the filter or filters to the first stage tank rather than to the second stage tank, but since the magnesium hydroxide accumulated in the filter is quite effective in silica removal, it is desirable to introduce it where it will have the maximum effect, i. e., in the second stage. In accordance with the invention it has been found that the silica content of water may be reduced from as much as 10 to 50 parts per million to 0.7 part per million. The treatment with the magnesium hydroxide, furthermore, is effected without the introduction into the water of the amount of sodium sulphate or other soluble salt corresponding to its formation.

It will be seen from the foregoing description that by use of the present apparatus involving two stages of operation and external preparation of magnesium hydroxide precipitate the use of the highly efficient silica adsorbing magnesium hydroxide may be enjoyed without introducing objectionable byproducts and with a maximum of economy of operation.

This method is not confined to the two-stage process but may also be used in the single stage process involving a lime and soda reaction tank followed by filters. The chemical reagents of lime and soda ash may be fortified by freshly precipitated and washed magnesium hydrate for efficient silica removal in place of magnesium oxide or dolomitic lime, as described heretofore. By the utilization of magnesium hydroxide precipitated externally to the sedimentation tank and introduced into the sedimentation tank as a washed precipitate, it was found that in the same plant in which the use of magnesium oxide was very ineffective and in which 100 p. p. m. of magnesium oxide was used to effect silica reduction from 10 p. p. m. down to approximately 5 p. p. m., there could now be obtained a reduction of the silica content down to 0.5 p. p. m.

It will be clear that various changes may be made in the process described herein while retaining substantial advantages thereof and, accordingly, the invention is not to be construed as limited except as required by the following claims.

What is claimed is:

1. A process for treating water for the removal of silica comprising passing the raw water to be treated into a first vessel, supplying the reaction products of lime and soda to said vessel to treat the water contained therein, separating the treated water from the resulting precipitate in said vessel, delivering the separated water to a second vessel, supplying an externally prepared and washed precipitate of magnesium hydroxide to said second vessel to treat the water contained therein, separating the treated water from the resulting precipitate in said second vessel, returning the precipitate from said second vessel to said first vessel, and discharging the last mentioned separated water from the process.

2. A process for treating water for the removal of silica comprising passing the raw water to be treated into a first vessel, supplying the reaction products of lime and soda to said vessel to treat the water contained therein, separating the treated water from the resulting precipitate in said vessel, delivering the separated water to a second vessel, supplying a solution containing phosphate ions and carying an externally prepared and washed precipitate of magnesium hydroxide to said second vessel to treat the water contained therein, separating the treated water from the resulting precipitate in said second vessel, returning the precipitate from said second vessel to said first vessel, and discharging the last mentioned separated water from the process.

3. Water treatment apparatus comprising a vessel, means for supplying raw water to be treated to said vessel, means for supplying the reaction products of lime and soda to said vessel to treat the water contained therein, means for separating the treated water from the resulting precipitate in said vessel, a second vessel, means for delivering the separated water to said second vessel, means for preparing and washing a precipitate of a magnesium hydroxide externally of said second mentioned vessel, means for mixing said washed precipitate with a solution containing phosphate ions, means for delivering said mixture to said second vessel to treat the water contained therein, means for separating the treated water from the resulting precipitate in said second vessel, a service connection, and means for delivering the last mentioned separated water from said second vessel to said service connection.

4. Water treatment apparatus comprising a vessel, means for supplying raw water to be treated to said vessel, means for supplying the reaction products of lime and soda to said vessel to treat the water contained therein, means for heating the water in said vessel, means for agitating the water and the resulting precipitate in said vessel, means for separating the treated water from the resulting precipitate in said vessel, a second vessel, means for delivering the separated water to said second vessel, means for supplying externally prepared and washed magnesium hydroxide to said second vessel to treat the water contained therein, means for agitating the water and the resulting precipitate in said second vessel, means for separating the treated water from the resulting precipitate in said second vessel, filtering means, means for delivering the separated water from said second vessel to said filtering means, a service connection, means for periodically backwashing the filtering means and means for returning the solid materials backwashed from the filtering means to said second vessel.

5. Water treatment apparatus comprising a vessel, means for supplying raw water to be treated to said vessel, means for supplying the reaction products of line and soda to said vessel to treat the water contained therein, means for heating the water in said vessel, means for agitating the water and the resulting precipitate in said vessel, means for separating the treated water from the resulting precipitate in said vessel, a second vessel, means for delivering the separated water to said second vessel, means for supplying externally prepared and washed magnesium hydroxide to said second vessel to treat the water contained therein, means for agitating the water and the resulting precipitate in said second vessel, means for separating the treated water from the resulting precipitate in said second vessel, filtering means, means for delivering the separated water from said second vessel to said filtering means, a service connection, means for delivering the water leaving the filtering means to said service connection, means for periodically backwashing the filtering means, and means for returning the solid materials backwashed from the filtering means to said second mentioned vessel.

CHARLES E. JOOS.

References Cited in the file of this patent

UNITED STATES PATENTS

| Number | Name | Date |
|---|---|---|
| 1,195,537 | Van Vloten | Aug. 22, 1916 |
| 1,402,277 | Yoder | Jan. 3, 1922 |
| 1,653,272 | Green et al. | Dec. 20, 1927 |
| 1,903,041 | Hall et al. | Mar. 28, 1933 |
| 2,142,515 | Joos | Jan. 3, 1939 |
| 2,262,745 | Adler | Nov. 18, 1941 |
| 2,287,486 | Reichett et al. | June 23, 1942 |
| 2,307,466 | Noll et al. | Jan. 5, 1943 |
| 2,382,902 | Paukey et al. | Aug. 14, 1945 |
| 2,401,924 | Goetz | June 11, 1946 |
| 2,428,418 | Goetz et al. | Oct. 7, 1947 |
| 2,447,511 | Leaf | Aug. 24, 1948 |
| 2,468,188 | Frankenhoff | Apr. 26, 1949 |